US009708924B2

(12) United States Patent
Al-Hawaj

(10) Patent No.: US 9,708,924 B2
(45) Date of Patent: Jul. 18, 2017

(54) COMBINED PUMP AND ENERGY RECOVERY TURBINE

(71) Applicant: KUWAIT UNIVERSITY, Safat (KW)

(72) Inventor: Osama M. Al-Hawaj, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 692 days.

(21) Appl. No.: 13/745,702

(22) Filed: Jan. 18, 2013

(65) Prior Publication Data

US 2014/0202144 A1 Jul. 24, 2014

(51) Int. Cl.

| | |
|---|---|
| ***B01D 21/30*** | (2006.01) |
| ***F01D 15/00*** | (2006.01) |
| ***F03B 13/00*** | (2006.01) |
| ***F03C 2/30*** | (2006.01) |
| ***F04C 2/344*** | (2006.01) |
| ***F04C 11/00*** | (2006.01) |

(52) U.S. Cl.

CPC .............. *F01D 15/00* (2013.01); *F03B 13/00* (2013.01); *F03C 2/304* (2013.01); *F04C 2/3446* (2013.01); *F04C 11/001* (2013.01); *F05B 2210/10* (2013.01); *F05B 2220/62* (2013.01); *F05B 2250/14* (2013.01)

(58) Field of Classification Search

None

See application file for complete search history.

(56) References Cited

U.S. PATENT DOCUMENTS

| | | | | |
|---|---|---|---|---|
| 3,703,081 A * | 11/1972 | Krebs et al. | 60/226.1 |
| 4,966,708 A * | 10/1990 | Oklejas et al. | 210/637 |
| 4,973,408 A * | 11/1990 | Keefer | B01D 61/06 210/137 |
| 6,659,067 B1 | 12/2003 | Al-Hawaj | |
| 6,773,226 B2 | 8/2004 | Al-Hawaj | |
| 2011/0108484 A1 | 5/2011 | Liberman et al. | |

OTHER PUBLICATIONS

Osama M. Al-Hawaj, "Sliding Vane Work Exchanger (SVWE)" Third International Desalination Workshop (IDW), Nov. 2010.
Osama M. Al-Hawaj, "Theoretical Analysis of Sliding Vane Energy Recovery Device" (Abstract only) Desalination & Water Treatment, vol. 36 Issue 1-3, p. 354, Dec. 2011.

* cited by examiner

*Primary Examiner* — Richard Gurtowski

(74) *Attorney, Agent, or Firm* — Richard C. Litman

(57) ABSTRACT

The combined pump and energy recovery turbine includes at least one fluid flow pressurizing a sliding vane pump and a sliding vane energy recovery turbine that recovers energy from a second fluid flow, such as the brine discharge from an RO seawater desalination system. A cylindrical rotor has two sliding vanes in respective slots, the rotor being concentrically disposed within an oval-shaped enclosure defining two mirror image crescent-shaped chambers, each chamber having inlet and outlet passageways. The first chamber pressurizes the first fluid flow, and the second chamber functions as a second outflow-driven energy recovery turbine, thus enabling the single rotor device to operate as a pressurizing pump on the first fluid flow, and second outflow-driven energy recovery turbine recovering energy from the pressure drop in the second fluid flow.

3 Claims, 6 Drawing Sheets

COMBINED PUMP AND ENERGY RECOVERY TURBINE

BACKGROUND OF THE INVENTION

1. Field of the Invention

The present invention relates generally to fluid pumps and turbines, and particularly to a combined pump and energy recovery turbine that may be used, e.g., in a desalination plant for pumping seawater through a reverse osmosis membrane.

2. Description of the Related Art

Large seawater reverse osmosis (SWRO) systems are prevalent in areas that do not have natural fresh water sources, such as streams and lakes. While the efficiency of an SWRO exceeds many other desalination methods, a substantial amount of energy is still required in SWRO plant operations. The reverse osmosis chamber needs to have a supply pump feeding its chamber for continuous output of permeate (fresh water). Booster pumps are often connected to some sort of work exchanger that captures fluid pressure from high-pressure brine output of the SWRO promise to increase efficiency of the system and lower the cost of operations. A more efficient work exchanger would be desirable.

Thus, a combined pump and energy recovery turbine solving the aforementioned problems is desired.

SUMMARY OF THE INVENTION

The combined pump and energy recovery turbine is a rotary sliding vane unit that can operate as a main system pump pressurizing a system destination, such as an RO (reverse osmosis) chamber, the pumping unit incorporating an energy recovery expander for reducing the operating cost by recovering energy from a second flow that may be an unwanted byproduct from the process, for example, brine discharged at high pressure from an RO seawater desalination system. The apparatus is a hydraulic pump mechanism suitable to serve as the first input pump of an RO system. The unitary device incorporates an energy recovery expander that recovers energy from the brine output flow of the RO system. The device may include a hydrodynamic lubrication means for sliding vanes in physical contact with its pump chamber. The pump chamber walls have rotor slots that reduce frictional losses through the device and, thus, energy recovery efficiency is improved.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 5:
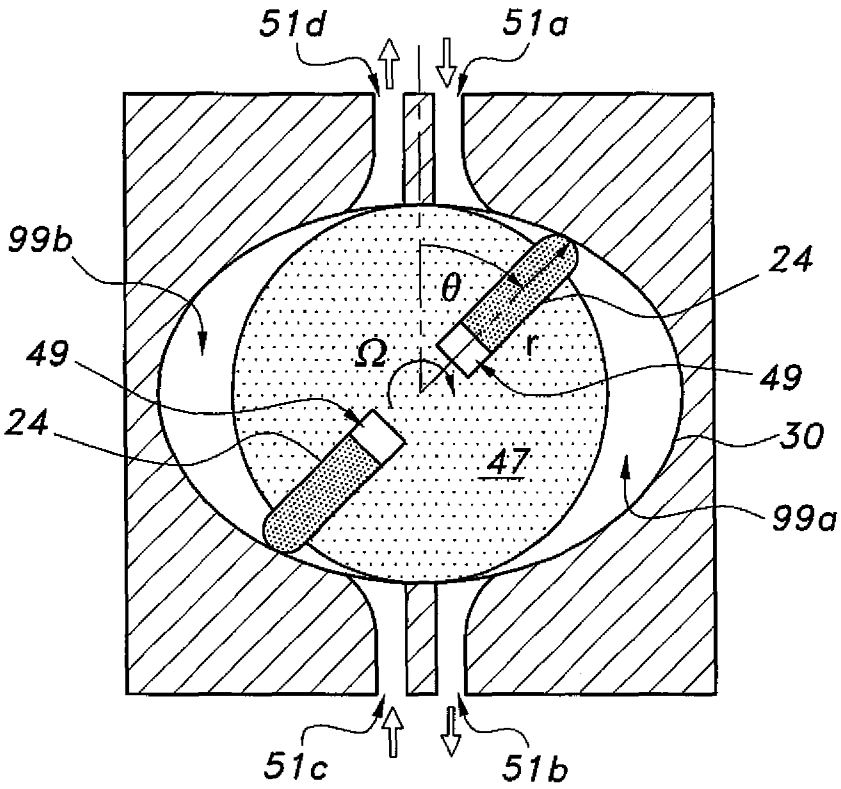
FIG. 5 shows a section view of a combined pump and energy recovery turbine according to the present invention, showing the elliptical cross section of the pump chamber and two sliding vanes disposed therein.
Figure 6:
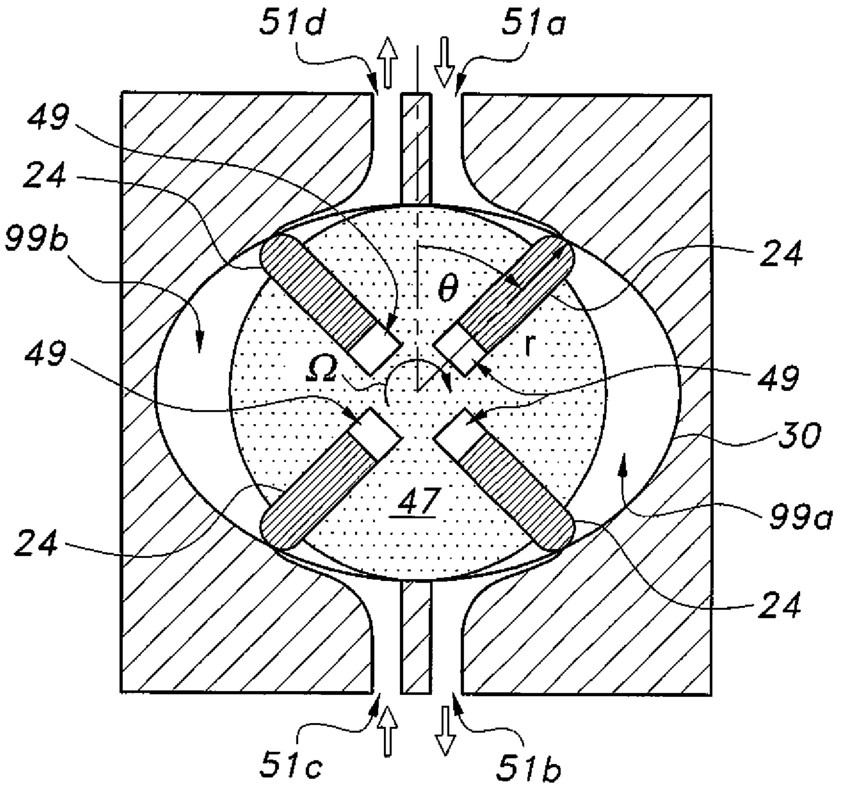
FIG. 6 shows a section view of another embodiment of the combined pump and energy recovery turbine according to the present invention, showing the elliptical cross section of the pump chamber and four sliding vanes disposed therein.

The combined pump and energy recovery turbine unit 10, as shown in FIGS. 1, 4, 5 and 6, comprises a fluid turbine module that includes at least one central cylindrical rotor 47 having a pair of vanes 24 as depicted in FIG. 5, or two pairs of vanes as another embodiment, as depicted in FIG. 6, mounted therein within diametrically opposed slots 49. As the rotor 47 rotates, the vanes 24 slide outwardly under centrifugal force. As most clearly shown in FIG. 5 and FIG. 6, the rotor(s) 47 is (are) mounted within an elliptical or oval-shaped housing 30 that constrains the amount of outward travel of the vanes 24 within the slots 49 according to the elliptical or oval shape of the inner wall of housing 30. Thus, the vanes 24 slide radially inward and outward. The vanes 24 are at a maximum distance from one another when oriented with the major axis of the elliptical housing 30, and the vanes 24 are closest to one another when oriented with the minor axis of the elliptical housing 30. As shown in FIG. 2, fluid turbine modules 13*a*, 13*b*, 13*c*, and 13*d* can be stacked in coaxial alignment with each other. The modules 13*a*, 13*b*, 13*c*, and 13*d* each have the centrifugally operated sliding vanes 24. When coaxially coupled, the rotor assemblies of modules 13*a*, 13*b*, 13*c*, and 13*d* define equal relative vane phase angle with respect to each other, the phase angle being equal to 180° divided by the number of rotors 47 in the system 10.

Figure 1:
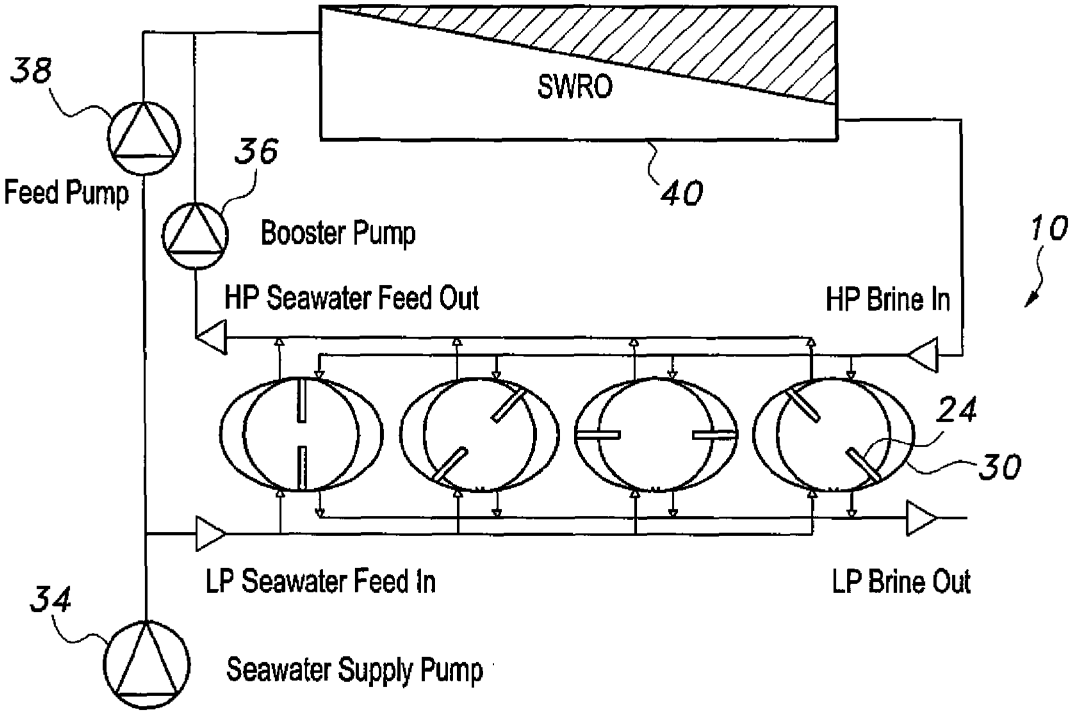
FIG. 1 is a block diagram of a combined pump and energy recovery turbine according to the present invention being used in energy recovery mode for a seawater RO system, the combined pump and turbine having multiple rotors.
Figure 2:
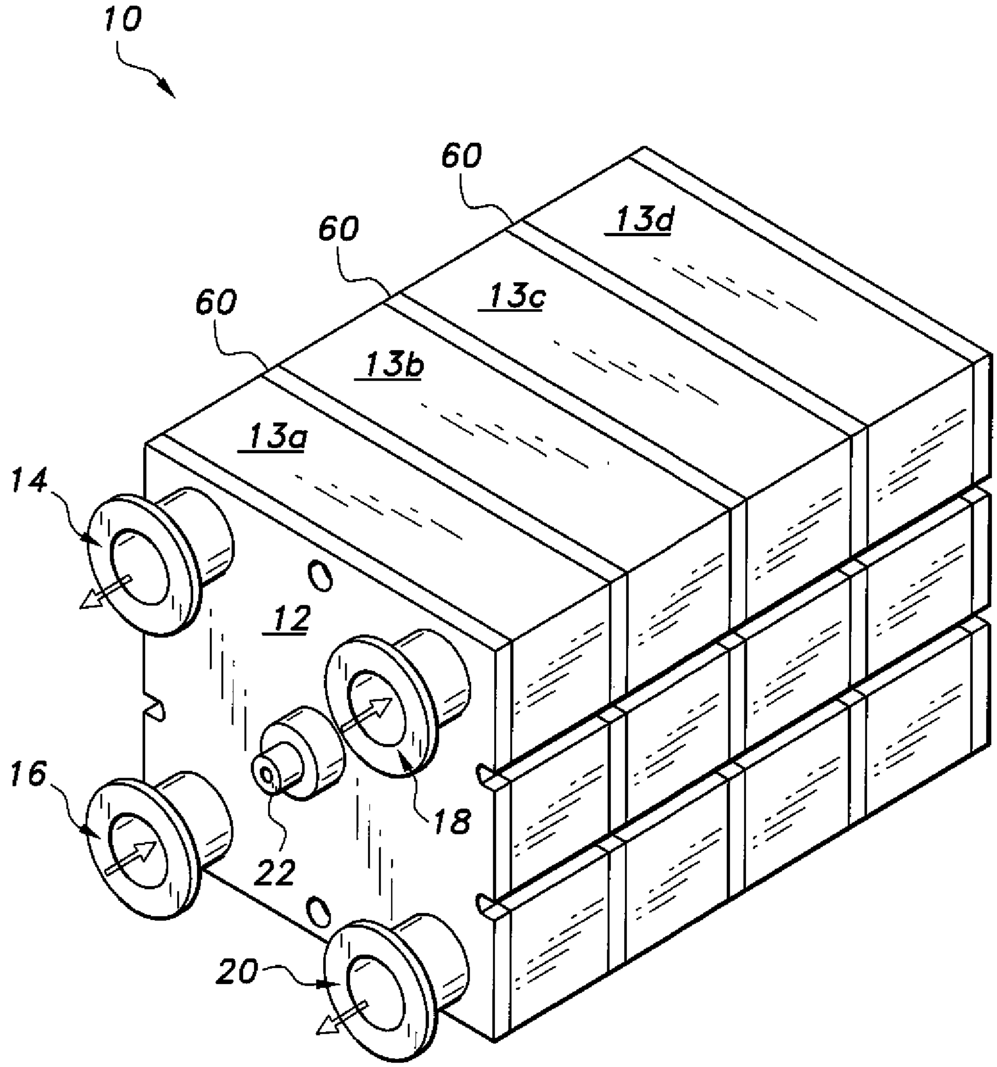
FIG. 2 is a perspective view of a combined pump and energy recovery turbine according to the present invention.

Referring to FIGS. 1 and 2, seawater is fed to a reverse osmosis system 40 by a seawater supply pump 34 and feed pump 38. The pressurized brine output is fed to the high-pressure (HP) brine inlet 18 of the first turbine module 13*a*, which drives rotation of each of the turbine modules 13*a* through 13*d* in the stack. Part of the initial seawater flow does not go to the feed pump 38, but is diverted into a low pressure (LP) feed inlet 16 of the combined pump and energy recovery turbine 10, and the rotation of the rotor(s) 47 caused by the high pressure brine driving the turbine portion of the unit causes the seawater to be pumped through the pump portion of the unit 10, and then to the reverse osmosis system with the aid of an additional booster pump 36 (shown in the block diagram of FIG. 1). The combined pump and energy recovery turbine 10 utilizes output brine pressure of the reverse osmosis unit 40 to drive the turbine to aid in the pumping of the seawater. The combined pump and energy recovery turbine 10 therefore converts the pressurized fluid flow of the brine to an additional source of seawater pumping energy.

The multi-rotor, multi-chamber assembly shown in FIGS. 1-4 includes at least one cylindrical rotator drum 47 having diagonal slots 49, which receive respective sliding vanes 24. As most clearly shown in FIG. 5 and FIG. 6, a rotor assembly 47 is coaxially disposed within a corresponding oval-shaped housing 30 that, in combination with the rotor 47, defines two-mirror image crescent-shaped chambers 99*a* and 99*b*. Each chamber 99*a*, 99*b* is connected to an intake manifold passageway (header), e.g., 51*a*, 51*c* and a discharge manifold passageway (header), e.g. 51*b*, 51*d*, the intake and discharge passageways being at opposite ends of the crescent-shaped chambers 99*a*, 99*b*. The intake and discharge headers 51*a* through 51*d* are fluid passageways defined in the oval-shaped housing body 30, the fluid passageways extending into the pump chambers 99*a*, 99*b*. The housing modules 13*a*, 13*b*, 13*c*, and 13*d* stack against each other in a coaxial configuration, the cylindrical rotor assemblies 47 being disposed inside the oval shaped central axial openings defined by the stacked modules 13*a*, 13*b*, 13*c*, and 13*d*. The last module 13*d* is sealed by a terminal endplate 45. Also, between the stacked modules 13*a*, 13*b*, 13*c*, and 13*d* are intermediate plates 60. Intermediate plates 60 close the oval chambers of the stacked modules 13*a*, 13*b*, 13*c*, and 13*d*. Also, the intermediate plates 60 are adjacent to the end of each rotors 47, thus sealing ends of the slots 49, completing each as a pressure cavity.

A faceplate 12 covers the first module 13*a*. The faceplate 12 has connecting ports 14, 16, 18, and 20, which extend into the inlet and outlet headers 51*a* through 51*d*. A HP feed outlet port 14 is connected to the HP feed outlet header 51*d*. A LP feed inlet port 16 is connected to the LP feed inlet manifold passageway (header) 51*c*. An HP brine inlet port 18 is connected to the HP brine inlet manifold passageway (header) 51*a*. Lastly, an LP brine outlet port 20 is connected to the LP brine outlet manifold passageway (header) 51*b*.

It should be understood that as a vane 24 in the rotor assembly 47 sweeps through a respective chamber 99*a* or 99*b*, the vane 24 divides the chamber into an intake sub-chamber at the trailing side of the vane and a discharge sub-chamber at the leading side of the vane 24. Thus, the combined pump and energy recovery turbine 10 is powered in this manner. HP brine water travels through the HP brine water inlet port 18 and into the connected inlet header 51*a* to thereby enter into the corresponding crescent-shaped chamber 99*a*, which may be referred to as the turbine chamber 99*a* or turbine portion of the unit 10. High pressure of brine water on vane 24 in contact with the inner wall of the crescent-shaped chamber 99*a*, fed by brine water inlet header 51*a*, causes rotary action of rotor 47, the vane 24 sweeping through the sub-divided crescent-shaped volume, thereby decreasing the pressure of the HP intake fluid as it travels toward the low pressure brine water outlet header 51*b*. The high-pressure brine water is expanded and displaced by the sweeping sliding vane 24 through the discharge port 20 in communication with discharge header 51*b* at lower pressure.

Conversely, LP seawater travels through the LP seawater inlet port 16, through the connected inlet header 51*c*, and into the corresponding crescent-shaped chamber 99*b*, which may be referred to as the pump chamber 99*b* or pump portion of the unit 10. The rotary action of the rotor 47 causes the vane 24, which is in contact with inner wall of the crescent-shaped chamber 99*b*, to sweep through the sub-divided crescent-shaped volume, thereby increasing the pressure of the intake fluid as it travels toward the high pressure outlet header 51*d*. The high pressure seawater exits via the outlet header 51*d*, and then through the HP feed outlet port 14. As shown in FIG. 1, this flow is directed to a booster pump 36, which feeds the SWRO 40.

To help guide rotary motion of the vanes 24, machined cam tracks may be formed along the inner wall of oval shaped housing 30. The vane outer tips may then engage the oval shape cam tracks formed in the chamber inner wall. Inlet manifold passageways 51*a*, 51*c* are arranged in the crescent-shaped chamber proximal to a tapered end of the housing 30, and outlet passageways 51*b*, 51*d* are arranged proximal to an opposing end of the housing 30. Such an arrangement results in flow from inlet to outlet in a counter current direction within the housing module of the combined pump and energy recovery turbine 10.

Figure 3:
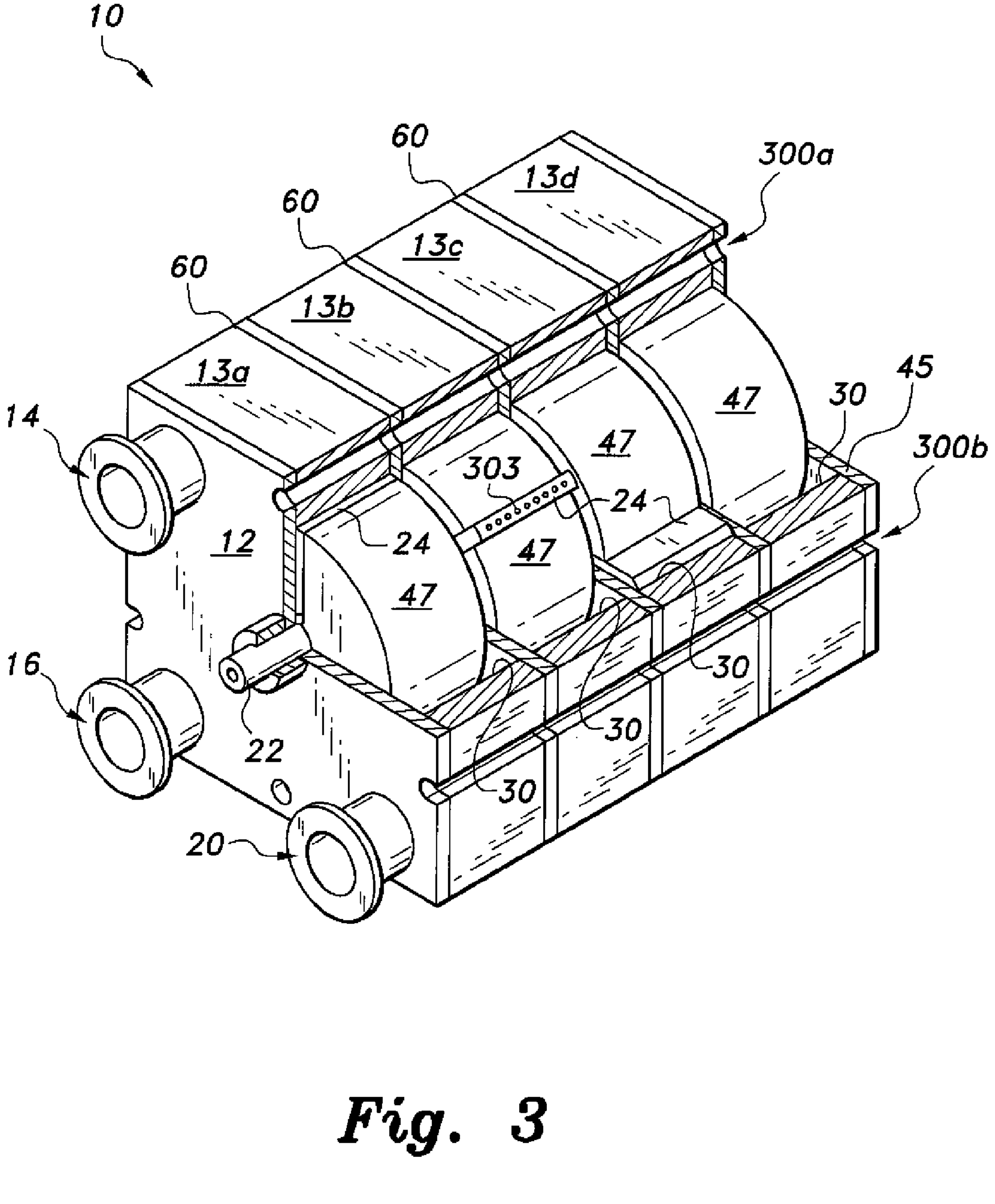
FIG. 3 is a perspective view of the combined pump and energy recovery turbine of FIG. 2, shown with a portion of the casing broken away and partially in section to show details thereof.
Figure 4:
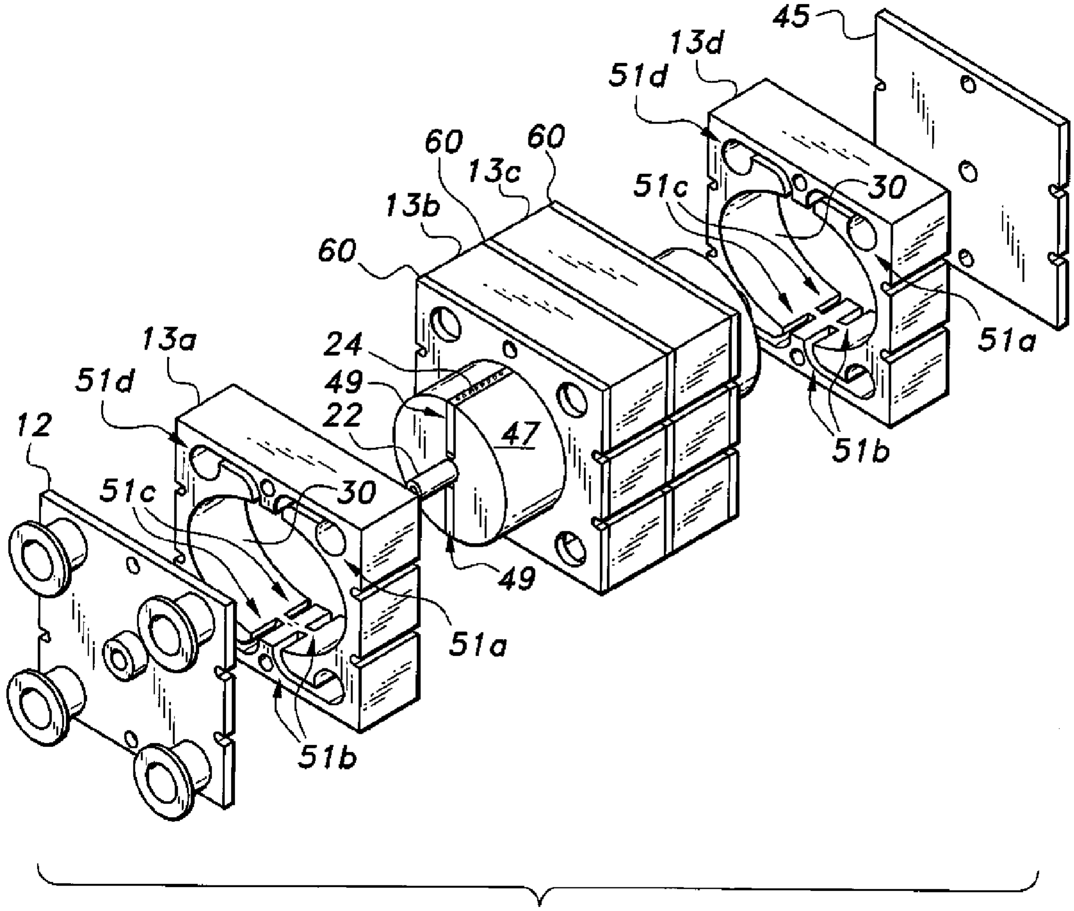
FIG. 4 is an exploded, perspective view of the combined pump and energy recovery turbine of FIG. 2.

As shown in FIG. 3, a power shaft 22 connected to the rotor 47 extends through the faceplate 12 and may be used to either provide auxiliary mechanical power or to receive auxiliary mechanical power. In the case where no auxiliary mechanical power is supplied, the outlet pressure from the HP feed outlet port 14 is less than the supply pressure at the HP brine inlet port 18, the combined pump and energy recovery turbine 10 operates in energy recovery mode. And in this case, an external booster pump 36 is needed to augment the pressure to the level of the discharge pressure of mean feed pump 38.

Optionally, the combined pump and energy recovery turbine 10 can also receive auxiliary mechanical power via power shaft 22. In the case where the supply pressure at the HP brine inlet 18 is less than the HP feed pressure at outlet port 14, the combined pump and energy recovery turbine 10 operates as a combination energy recovery turbine and booster pump mode. And in this case, an external booster pump 36 may not be needed to augment the pressure to the level of the discharge pressure of mean feed pump 38.

Referring to FIG. 3, channels 300*a* and 300*b* are longitudinally disposed along the pump modules 13*a*, 13*b*, 13*c*, and 13*d*, to be used together with tie rods (not shown) for assembly of said modules as one unit. Additionally, a portion of high-pressure fluid can be re-routed to a pressure cavity in the chambers 99*a*, 99*b*, the pressure cavity communicating the pressure cavity re-routed stream to an inner portion of the slots 49 of rotor 47. Tips of vanes 24 have openings 303 through which re-routed high pressure fluid can travel and lubricate the vanes 24 for reduced frictional contact with the chamber walls.

Thus, in the exemplary SWRO combined pump and energy recovery turbine 10, a first chamber 99*a* and corresponding one of the sweeping sliding vanes 24 operate as an energy recovery-expander receiving high pressure brine from an RO vessel and disposing the spent brine to waste, thereby recovering energy used for pressurizing seawater in a second chamber 99*b*. The second chamber 99*b* and its corresponding one of sweeping sliding vanes 24 operate as a pump for pressurizing flow, such as seawater feed in the RO plant. The system 10 can be optimized for application in a seawater RO system to provide benefits including simplicity, compact machine size and low capital and operating costs. Long term reliability can be enhanced by employing hydrodynamic lubrication of the sliding vanes 24.

While a single rotor 47 produces a generally sinusoidal fluid flow through the pump portion of the unit, four rotors 47 that are coaxially coupled in such a manner that their vanes 24 are staggered or equally spaced radially produce fluid flow at a generally constant rate through the pump portion of the combined pump and energy recovery turbine unit 10.

Another embodiment of the combined pump and energy recovery turbine is a turbo-compressor where the first fluid flow is low pressure steam introduced through the first inlet port and the second fluid flow is high pressure steam introduced through the second inlet port. Here, the purpose of the device is compress the low pressure steam to a higher pressure using the pressure energy of available high pressure steam.

Another embodiment of the combined pump and energy recovery turbine is a turbocharger for power plants where the first fluid is air introduced at atmospheric pressure through the first inlet port and the second fluid flow is high pressure exhaust gases from the plant introduced through the second inlet port.

Still another embodiment of the combined pump and energy recovery turbine is a turbo-vacuum pump where the first fluid flow is low pressure gas or vapor from a low pressure chamber under vacuum introduced through the first inlet port and the second fluid flow is high pressure steam introduced through the second inlet port. Here, the purpose of the device is maintain vacuum or remove unwanted gases from a process chamber using the pressure energy of available high pressure steam.

It is to be understood that the present invention is not limited to the embodiments described above, but encompasses any and all embodiments within the scope of the following claims.

I claim:

1. A combined pump and energy recovery turbine, comprising:

a housing having an inner wall defining an oval-shaped opening centrically disposed therethrough, at least one inlet manifold, and at least one outlet manifold;

the at least one inlet manifold consists of a first inlet manifold and a second inlet manifold;

the at least one outlet manifold consists of a first outlet manifold and a second outlet manifold;

wherein the first inlet manifold being designed and configured to introduce a first fluid material into a first portion of the oval-shaped opening, and the first outlet manifold being designed and configured to release the first fluid material from the first portion of the oval-shaped opening;

wherein the second inlet manifold being designed and configured to introduce a second fluid material into a second portion of the oval-shaped opening, and the second outlet manifold being designed and configured to release the second fluid material from the second portion of the oval-shaped opening;

a cylindrical rotor coaxially disposed within the oval-shaped opening of the housing, the cylindrical rotor having an outer axial wall defining a periphery of the cylindrical rotor;

wherein the first and second fluid materials flow into the housing, about the cylindrical rotor, and exit the housing;

wherein the inner wall of the housing and the outer axial wall of the cylindrical rotor define a first crescent-shaped chamber and second crescent-shaped chamber within the oval-shaped opening;

whereby the first crescent-shaped chamber is the first portion of the oval-shaped opening, and the second crescent-shaped chamber is the second portion of the oval-shaped opening;

the cylindrical rotor having at least one pair of slots extending from the outer axial wall into the cylindrical rotor and terminating near an axial center of the cylindrical rotor;

the at least one pair of slots defining a first slot and a second slot diametrically opposite the axial center of the cylindrical rotor;

a plurality of vanes, each one vane of the plurality of vanes being slidably disposed in each one slot of the at least one pair of slots, respectively;

wherein each vane slidably extends beyond the outer axial wall of the cylindrical rotor to the inner wall of the housing;

a shaft coupled to and coaxially disposed with the cylindrical rotor, and the shaft extending beyond the housing;

a face plate disposed on the housing, the shaft extending through the face plate;

the face plate having a first inlet port operatively coupled to the first inlet manifold, a first outlet port operatively coupled to the first outlet manifold, a second inlet port operatively coupled to the second inlet manifold, and a second outlet port operatively coupled to the second outlet manifold; and an end plate disposed on the housing opposite the face plate;

wherein the face plate and the end plate structurally affixed to the housing so that the first and second crescent-shaped chambers being enclosed therebetween;

wherein the first fluid material is introduced at low pressure into the first crescent-shaped chamber via the first inlet port and first inlet manifold, and is released from the first outlet port at a higher pressure by rotation of the cylindrical rotor;

wherein the second fluid material is introduced at high pressure into the second crescent-shaped chamber via the second inlet port and second inlet manifold, and is released from the second outlet port at a lower pressure by rotation of the cylindrical rotor;

whereby the flow of the first and second fluid materials is in a circumferential direction within the first and second crescent shaped chambers;

whereby a turbine drive is produced by the plurality of vanes and the cylindrical rotor, thereby recovering energy results in continued pumping of the first fluid material through the first crescent-shaped chamber; and wherein the shaft is connected to the rotor for power transmission to and from the rotor;

wherein between each of the slots and the corresponding sliding vane, a pressure cavity is defined therein, the pressure cavity accepting lubricating fluid therein;

a plurality of lubrication openings disposed through each of the sliding vanes, the plurality of lubrication openings being in operable communication with the pressure cavity to expel the lubricating fluid from the lubrication openings during operation of the turbine.

2. The combined pump and energy recovery turbine according to claim 1, further comprising an oval-shaped cam track formed in the end plate, an outer tip of each one of the plurality of sliding vanes engaging the oval-shaped cam track.

3. The combined pump and energy recovery turbine according to claim 1, wherein the at least one pair of slots of the cylindrical rotor comprises two pair of slots;

each pair of slots include a first slot, and a second slot, each first and second slot having a respective slidably vane corresponding thereto.

* * * * *